J. H. AND A. H. SIERT.
LAUNDRYING MACHINE.
APPLICATION FILED JUNE 7, 1920.

1,389,388.

Patented Aug. 30, 1921.
4 SHEETS—SHEET 1.

Witness
Evan P. Morris

Inventors
JOHN H. SIERT
AND
ALVIN H. SIERT.
By Arthur H. Sturges,
Attorney

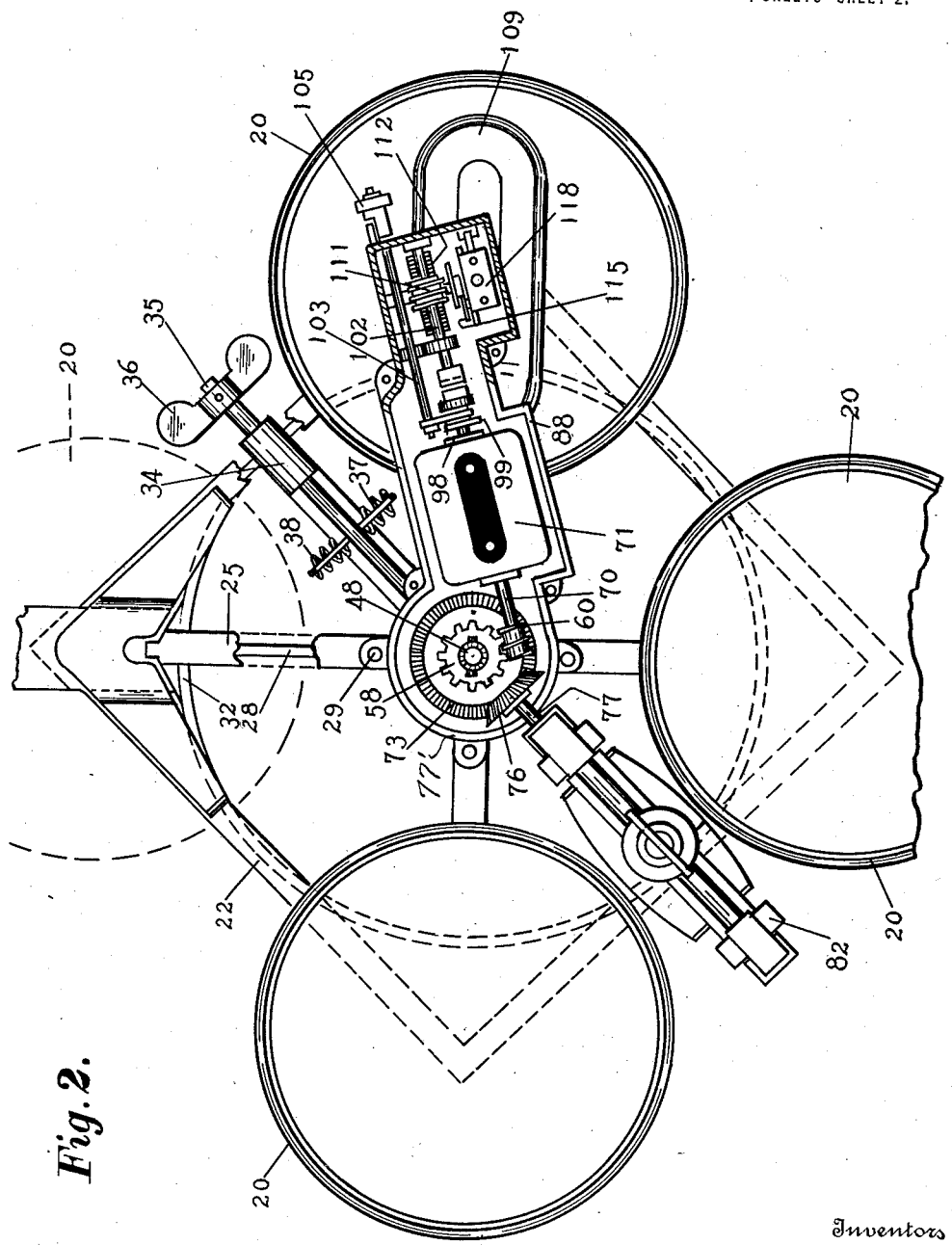

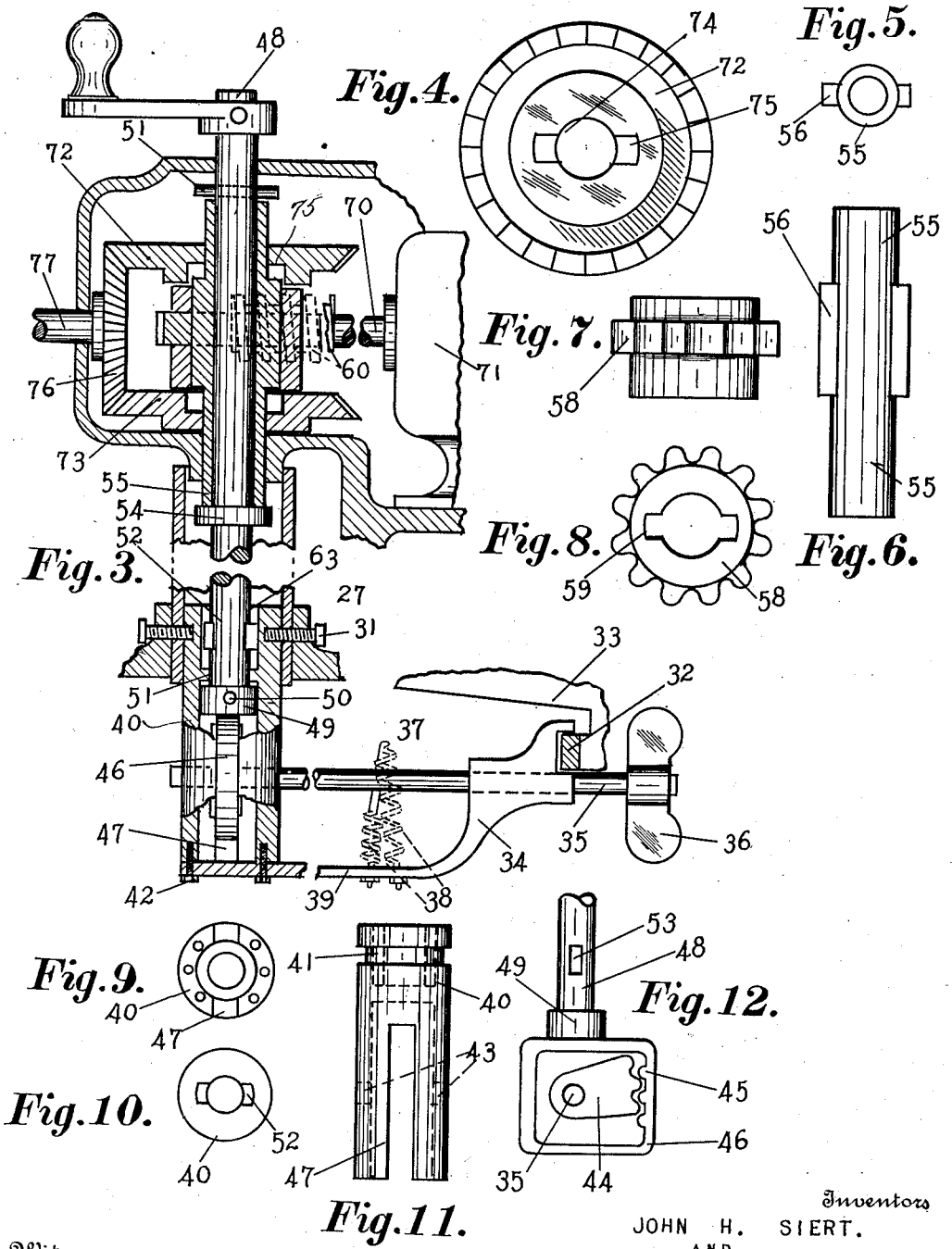

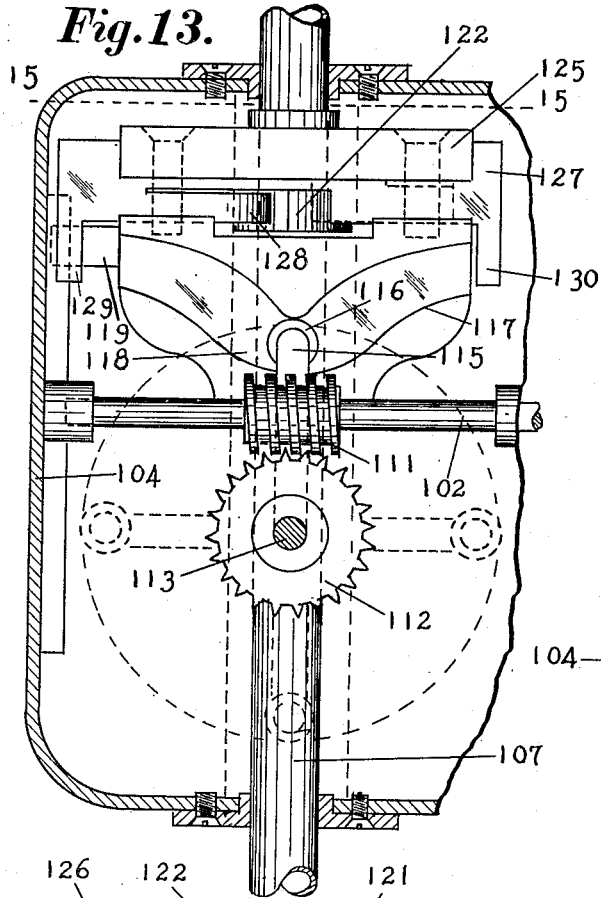
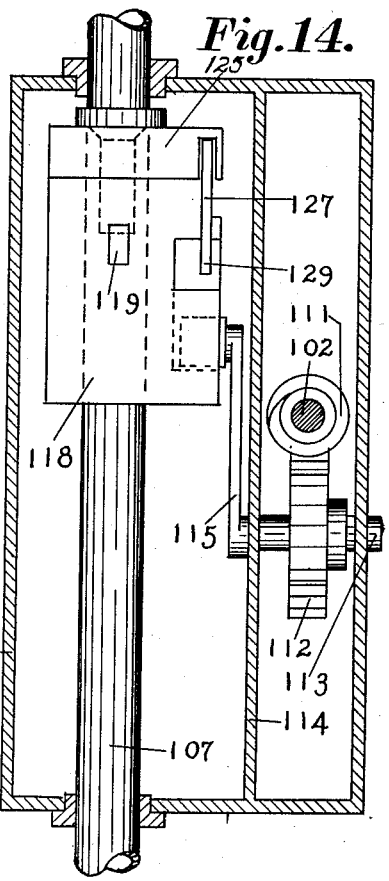
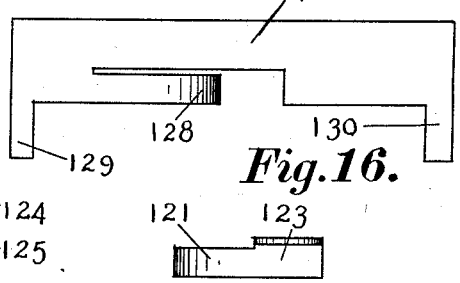

UNITED STATES PATENT OFFICE.

JOHN H. SIERT AND ALVIN H. SIERT, OF OMAHA, NEBRASKA.

LAUNDRYING-MACHINE.

1,389,388.  Specification of Letters Patent.  Patented Aug. 30, 1921.

Original application filed March 8, 1920, Serial No. 364,062. Divided and this application filed June 7, 1920. Serial No. 387,211.

*To all whom it may concern:*

Be it known that we, JOHN H. SIERT and ALVIN H. SIERT, citizens of the United States, residing at Omaha, in the county of Douglas and State of Nebraska, have invented certain new and useful Improvements in Laundrying-Machines, of which the following is a specification.

The present invention relates to improvements in laundrying machines and consists more particularly in certain improvements over prior U. S. Patent No. 1,220,697, granted March 27, 1917, to John H. Siert.

This is a divisional application of my copending application, Serial Number 364,062, filed March 8, 1920.

It is an object of the present invention to provide a machine for washing, rinsing, and wringing clothes, which will be convenient in use and conveniently and inexpensively manufactured.

Another object of the invention is to provide the various mechanisms in grouped relation so that they will occupy a minimum of space.

A further object of the invention is to mount the motor above the washing apparatus to facilitate the operation thereof and to avoid the spilling of water upon the conducting parts which have a tendency to short-circuit the same, and to result in the rapid deterioration of the motor.

A still further object of the invention is to simplify the gearing and several moving parts and to provide for the convenient shifting of the parts to secure rotation in either direction of the wringer rollers.

A still further object of the invention is to provide an improved mechanism for actuating the dasher which will communicate to the same an intermittent vertically reciprocating movement designed to facilitate the rapid formation of suds in the clothes tub.

With the foregoing and other objects in view the invention consists in the combinations, constructions, and arrangements of parts as herein described and illustrated in the accompanying drawings, wherein like symbols refer to like or corresponding parts throughout the several views, and in which:—

Fig. 2 is a horizontal sectional view taken on the line 2—2 in Fig. 1.

Fig. 3 is a vertical sectional view taken on an enlarged scale of the gear assembly, operating shaft and pedal, and the housings therefor shown partly broken away and indicating the motor in fragmentary elevation.

Fig. 4 is a bottom plan view of one of the recessed gear wheels taken on an enlarged scale.

Fig. 5 is a plan view of a clutch employed in conjunction with the gear wheel shown in Fig. 4.

Fig. 6 is a side elevation of the clutch.

Fig. 7 is a side elevation of a worm gear.

Fig. 8 is a plan view of the same.

Fig. 9 is a bottom plan view of the rotatable, slotted housing for the pedal shaft.

Fig. 10 is a top plan view of the same.

Fig. 11 is a side elevation of the housing.

Fig. 12 is a side elevation, partly broken away, of the clutch operating shaft and the pedal actuated mechanism.

Fig. 13 is a vertical sectional view through the dasher operating mechanism with parts broken away.

Fig. 14 is a vertical sectional view through the dasher operating mechanism taken at right angles to Fig. 13.

Fig. 15 is a horizontal sectional view taken on line 15—15 in Fig. 13.

Fig. 16 is a side elevation of the dasher rotating mechanism, and

Fig. 17 is a side view of a spring detent for holding the dasher shaft against backward movement.

Figure 1:
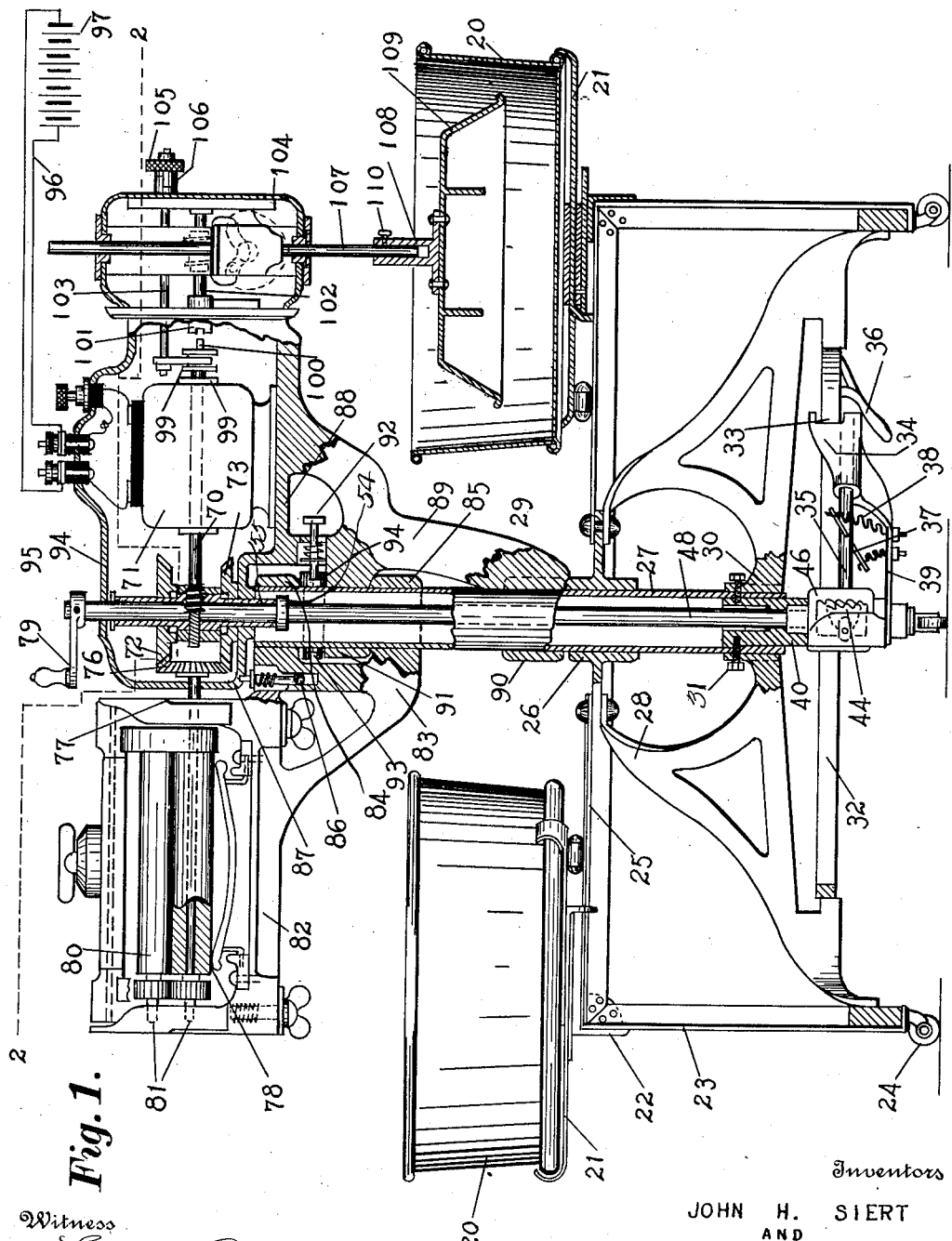
Figure 1 is a transverse vertical sectional view, with parts shown in elevation, of an improved laundrying machine, constructed according to the present invention.

Referring more particularly to the drawings, 20 designates wash tubs provided in any suitable number and supported upon mechanism 21 that admits of the tubs being tilted to pour off the water; this mechanism being of any suitable construction, such for instance as that shown and described in the prior patent aforesaid.

The mechanisms 21 are preferably four in number and are supported at the corners of a rectangular frame 22, which is advantageously of angle iron construction and is sustained by legs 23 provided at the corners thereof and having casters 24 on which the machine may be easily wheeled along.

Diagonal beams 25 extend from the corners of the rectangular frame 22 and are connected at their inner ends to a common collar 26 which surrounds and is fixed to a hollow, vertically disposed support 27. Braces 28 are likewise secured, as by the same rivets or other fastenings 29 to the collar 26 and extend downwardly to the lower portions of the legs 23. The braces 28 are formed with a collar 30 lying beneath and coaxial with the collar 26 and also made to embrace the hollow support 27, to which the same may be secured as by the set screw 31.

A circular rail 32 is carried by the braces 28 beneath the collar 30 and arranged coaxial with respect to the hollow support 27, this rail 32 providing a support for an overhanging lip 33 on a sleeve 34, which forms a bearing for a rock shaft 35. These several parts are more clearly shown in the enlarged views Figs. 3 and 9 to 12, inclusive. The rock shaft 35 extends beyond the circular rail 32 where it carries a double treadle 36 in convenient position for engagement by the foot of the operator to rotate the shaft 35 in either direction. Passing through the rock shaft is a bar 37, to the outer ends of which are connected springs 38 normally acting to maintain the rock shaft 35 in a neutral position and tending to restore the same to this neutral position in opposition to the action of the foot of the operator on the wings of the treadle 36. The lower ends of the coil springs 38 are secured to a brace 39, which is preferably part of the casting including the sleeve 34. As illustrated most clearly in Fig. 3, the brace 39 extends radially of the frame and the various parts of the apparatus and has its inner end lying beneath a hollow housing 40, which fits within the lower end of the hollow support 27 and is rotatably held in this position by the set screws 31 which freely engage in a groove 41 formed circularly near the upper end of the housing 40 and on the exterior thereof. Screws or other fastening means 42 serve to secure the brace 39 to the lower end of the housing 40. The housing 40 is provided with perforations 43 in horizontal alinement to receive, and form a bearing for, the inner end of the radially extending rock shaft 35, which carries a toothed segment 44 lying within the housing 40 and having engagement with teeth 45 provided on the interior of a yoke 46. The yoke 46 is rectangular and plays in vertically elongated slots 47 provided in the housing 40 as best seen in Fig. 11.

The yoke 46 is carried on the lower end of a vertically reciprocating clutch operating shaft 48, fitting within collar 49 and held there, as by a pin 50 shown in Fig. 3. The upper movement of the clutch shaft 48 is limited by the collar 49 striking a diaphram 51 extending inwardly of the housing 40. Above the internal shoulder 51 the housing 40 is provided with diametrically-opposed vertically elongated slots 52 lying adjacent the clutch operating shaft 48 which carries lugs 53 seating in such slots 52 and, while being freely movable in a vertical direction therein without affecting the housing 40, are adapted to cause such housing to turn with the shaft 48.

The hollow support 27, together with the clutch operating shaft 48, extends to a considerable height above the frame 22 and near the upper end of the hollow support 27, the shaft 48 is provided with a collar 54 on which freely rests the lower end of a tubular clutch sleeve 55 shown in Figs. 5 and 6 which have a pair of diametrically-disposed feathers or clutch keys 56 elongated in a vertical direction. A pin 57 passing transversely through the clutch operating shaft 48 confines the upper end of the clutch sleeve 55.

The pin 57 at the upper end and the collar 54 at the lower end thus cause the clutch sleeve 55 to move vertically up and down in accompaniment to the similar movement imposed on the clutch operating shaft 48. A worm wheel 58, shown in detail in Figs. 7 and 8, surrounds the intermediate portion of the clutch sleeve 55 and is formed with slots 59 receiving the feathers or keys 56 and in this manner communicating rotation to the clutch collar 55, which may turn on the shaft 48 between the collar 54 and pin 57 without in turn driving the same. The teeth of the worm wheel 58 are enmeshed with a worm 60 on a shaft 70 receiving rotation from an electric motor 71.

Mounted to turn freely on the clutch sleeve 55 respectively above and below the feathers or keys 56 are an opposed pair of horizontally arranged bevel gear wheels 72 and 73, each of which is formed in plan as illustrated in Fig. 4. Here the gear wheels are seen to have central bores 74, and, communicating with bores at diametrically opposite points a pair of notches or recesses 75, in which to receive the upper and lower ends of the feathers or keys 56 of the clutch sleeve 55. In Fig. 3 the feathers or keys 56 are shown as partially admitted to the notches or recesses 75 of the upper gear wheel 72 and in consequence the rotation imparted to the clutch sleeve 55 from the motor 71 through the intermediary of the worm 60 and wormwheel 58 will be communicated to said upper gear wheel 72 and will cause the definite rotation thereof in a predetermined direction as controlled by the direction of the movement of the motor shaft 70. It will be well understood that when the clutch sleeve 55 is shifted downwardly to cause the feathers or keys 56 to disengage the upper gear wheel 72 and enter the notches or recesses of the lower gear wheel 73 that rotation in the same direction will be imparted thereto. Meshing with both upper and lower wheels 72 and 73 is a third bevel gear wheel 76 fixed on a shaft 77, shown in Fig. 1 to be an extension of the shaft carrying the lower roller 78 of the wringer rolls. As a consequence rotation imparted by the upper gear wheel 72 will be in one direction as respects the third gear 76 and its shaft 77, while rotation in the opposite direction will be the result where the clutch is engaged with the lower gear wheel 73. The arrangement therefore provides for the driving of the wringer rolls in either direction. The shaft 77 swings horizontally in a slot 77' made in the casing 94.

The shaft 48 at its upper end is provided with a crank handle 79 by which it may be manually rotated to bring the treadle 36 to a position adjacent the particular tub 20 where the operator is in attendance.

The upper wringer roll is indicated at 80 and is driven by pinions 81 from the shaft of the lower roller 78. The frame 82 of the wringer rollers is formed with a bracket 83 having vertically spaced apart collars 84 and 85 rotatably fitted about the hollow support 27 to permit the frame 82 to be swung about over any one of the four tubs 20.

A spring pressed detent 86 is carried by the bracket 83 and is adapted to engage in one of a series of notches 87 provided in the adjacent wall of the housing 88 which contains the motor 71. By disengaging the detent 86 the bracket 83 may be swung about the hollow support 27 to bring the same to a position above any of the tubs 20, where the same may be locked by allowing the reengagement of the detent with one of the notches 87; or the wringer frame may be supported between two of the tubs 20 where clothes are to be wrung from one tub to an adjacent tub.

As shown in Fig. 1 the motor housing 86 is formed with a bracket 89 having a hub 90 at its lower end rotatably embracing the hollow support 27 and supported upon the collar 26. A second collar 91 is formed on the bracket 89 and embraces the hollow support 27 between the collars 84 and 85 of the wringer frame. The two collars 90 and 91 provide for the support of the motor housing 88 and the dasher operating mechanism, while at the same time allowing these parts to be swung in a circle as required to bring the dasher above each of the tubs 20. A spring pressed detent 92 carried by the bracket 89 is adapted to enter any one of four notches 93 provided in a ring 94 shrunk on the hollow support 27 between the collars 84 and 91.

The notches 93 are spaced apart 90° about the ring 94 so that the bracket 89 may be locked by the detent 92 in any one of four positions in each of which the dasher will be in operative position with respect to a tub 20.

The motor housing 88 is provided with a cover 94 having binding posts 95 to which leads 96 are connected carrying current from a battery or other source 97 to the motor 71.

The motor 71 is provided with another shaft 98 extending oppositely with respect to the shaft 70, and having an axially slidable clutch collar 99 provided with a squared end 100 adapted to enter a similarly squared socket 101 in a dasher driving shaft 102. A rod 103 is slidable through the dasher casing 104 and is connected at its inner end to the clutch collar 99. A knurled head 105 on the outer end of the rod 103 provides for the manipulation of the same and an eccentric device 106 is arranged in conjunction with the knurled head for shifting the rod 103 back and forth as required to engage and disconnect the clutch 100, 101.

The dasher shaft is represented at 107 having its lower end adjustably fitted in a socket 108 of the dasher 109 and being secured therein by a set screw 110.

Reference is now had to Figs. 13 to 17 inclusive which show the improved dasher operating mechanism. The operating shaft 102 carries a worm 111 rotated by the electric motor 71 when the clutch 100, 101 is engaged. A worm wheel 112 is enmeshed with the worm 111 and receives rotation therefrom. The worm wheel 112 is mounted on a shaft 113 journaled in one wall of the housing 104 and a partition 114 therein. The shaft 113 extends through the partition 114 and carries an arm 115 cranked at its outer end to receive a roller 116, which travels in a cam groove 117 provided in a head 118, fixed in any suitable manner to the dasher shaft 107. The groove 117 is peculiarly formed and is best seen in Fig. 13, it having a centrally sharply depressed or trough portion 118' for a purpose to be later described.

The head 118 carries at one side a projection 119 entering between a pair of guides 120 to prevent the rotation of the head with the dasher shaft 107 but allowing of the free vertical movement thereof. A dog 121 engages with a ratchet wheel 122 fixed on the dasher shaft 107 and is adapted to prevent retrograde movement of the same. The dog 121 is formed with a plate 123 held in place by a screw or bolt 124 which also secures a cap 125 on the head 118. A second screw or bolt 126 is employed for a like purpose at the other side of the cap piece 125. Both the cap 125 and the head 118 are slotted transversely to receive a reciprocating bar 127 having a pawl 128 cut therefrom and bent inwardly to engage the teeth of the ratchet 122. Arms 129 and 130 depend at opposite ends of the reciprocating bar 127 and are arranged to come alternately close to the opposite mouths of the cam groove 117, whereby the roller 116 may strike such arms 128 and 129 for the purpose of shifting the bar 127 back and forth.

In use, the bracket 89 carrying the motor casing and dasher operating mechanism is swung about the hollow shaft 27 after disengaging the detent 92, and the dasher 109 is brought to a position over the particular tub 20 desired, whereupon the detent 92 will engage the particular notch 93 in the ring 94 presented to it and will lock these parts effectually in this new position throughout the washing operation.

In like manner the bracket 83 carrying the wringer rolls may be rotated about the hollow support 27 to a desired position, where it is locked by the engagement of its detent 86 in one of the perforations 87 in the motor housing 88.

The operator by grasping the hand crank 79 may rotate the clutch operating shaft 48 so as to bring the treadle 36 to a point agreeing with the new position of the other part whereby the operation of engaging and disconnecting the clutch may be accomplished without his having to walk around the apparatus.

The springs 38 will constantly hold the parts in such position that the feathers or keys 56 of the clutch sleeve 55 remain out of engagement with both of the gear wheels 72 and 73. The operator may depress either wing of the treadle 36 accordingly as he desires to drive the wringer rolls in the one or the other direction and this movement will act to rock the shaft 35 in either a clockwise or counter-clockwise direction, the effect of which, acting through the segment 44 and yoke 46 will be to either raise or lower the shaft 48 and with it the clutch sleeve 55 so that either the upper or lower gear wheels 72 or 73 will be driven by the motor 71. When the wringer is to be discontinued in operation, the operator releases pressure on the treadle 36 and the springs 38 return the several parts to their normal position and the clutch will move out of engagement with both gear wheels, the worm wheel 58 therefore turning idly.

Whenever the operation of the dasher 109 is to be commenced or discontinued the operator has resort to the knurled head 105, by which he causes the connection or disengagement of the clutch 100, 101. When this clutch is in engagement the shaft 102 derives a continuously rotary movement from the electric motor which it transmits to the roller carrying arm 115 through the worm gearing. The roller 116 is caused by this mechanism to describe a circular path as shown in Fig. 13 and it carries with it the head 118 which is fixed to the dasher shaft 107, with the result that the dasher 109 is caused to undergo a vertically reciprocating movement through the clothes in the tub 20.

The plunger partakes of a compound movement which is the resultant of a circular movement of the roller 116 and the further movement of the roller 116 transversely of the head 118 and through the cam groove 117. It is quite evident that the roller 116 describing as it does a circular path will reciprocate the head 118, and this would be so even if a straight slot were provided across the head to receive the roller which would be the ordinary method of converting circular motion into reciprocating motion. However, there is another component force that enters into the reciprocating movement of the plunger and which is derived independently of the circular movement of the roller 116 but which is occasioned by such circular movement, and this further component is derived from the traverse of the roller 116 in the cam groove 117 which has a depressed intermediate lower portion and a peaked intermediate upper portion causing the roller in its traversing movement through the groove 117 to impose a comparatively small reciprocating movement on the head. It is quite evident that if the roller 116 were made to travel in a rectilinear path back and forth in a horizontal direction it would cause a reciprocating movement of the head 118 and consequently of the plunger. The head in describing its circular movement however travels in a path that is the component of this horizontal movement just described and consequently there is superimposed on the head 118 a resultant movement, the components of which are the circular movement of the roller 116 and its traverse cross-wise in the groove 117.

As the roller 116 moves from one mouth to the other of the cam groove 117 it will alternately strike the opposite arms 129 and 130 and cause the reciprocation of the bar 127 which carries the pawl 128. At each recurrence of this movement the pawl 128 will act on the ratchet teeth 122 to move the dasher shaft 107 through a predetermined portion of a revolution thus changing the horizontal position of the dasher 109 at each succeeding stroke to the end that it may be brought into engagement with all parts of the clothing in the tub.

It is understood that we are not limited to the size, form or proportion of the various parts and that various changes and modifications may be resorted to without departing from the spirit of the invention provided such changes fall within the scope of the appended claims.

What is claimed is:

1. A laundrying machine comprising a framework, a hollow support passing centrally up through said frame, a wringer frame swinging about said hollow support, a hollow motor frame also swinging about said support, a motor in said motor frame, gearing driven by said motor, a slidable clutch sleeve associated with and driven by said gearing, a pair of opposed gears normally idle but adapted to be alternately coupled with said clutch sleeve, a shaft passing up through said hollow support and having a part engaging with the lower end of said clutch sleeve whereby to raise and lower the same, a treadle adjustably mounted on said framework, means at the upper end of said shaft above the motor casing for moving the shaft and said treadle in a circular direction, means associated with and operated by said treadle for shifting the shaft longitudinally in the hollow support, and wringer rolls in said wringer frame driven by said gears.

2. A laundrying machine comprising a framework, a hollow support extending vertically up through said framework, a wringer frame having wringer rolls movable about said hollow support, a hollow motor frame also movable about said hollow support, a motor in the motor frame, gear means driven by the motor and having connection to the wringer rolls for driving the latter, said gearing including a pair of opposed gear members adapted to drive the wringer rolls in opposite directions, a clutch sleeve mounted therebetween, a shaft passing up through the hollow support and having engagement with said clutch sleeve to shift the latter into engagement with one or the other of the gear members, a yoke carried by the lower end of the shaft having internal teeth, a pivoted segment within the yoke meshing with said teeth, and a treadle mechanism adjustably mounted beneath the supporting framework and adapted to be oscillated in either direction whereby to raise or lower the shaft through the segment yoke teeth.

3. A laundrying machine comprising a framework, a hollow support extending up through the framework, a wringer frame rotatably mounted about said support, a hollow motor frame also rotatably fitted about said support, means for locking said motor and wringer frames together and against movement about said support, wringer rollers mounted in said wringer frame, a motor mounted in said motor frame, gear mechanism connecting said motor and wringer rolls and including a pair of opposed gear members adapted to drive the wringer rolls in reverse directions, a rotatably and vertically slidable shaft fitted through said hollow support, a clutch sleeve engaging about said shaft between said gear members and adapted to be moved into engagement with either of the same accordingly as the shaft is raised or lowered, a yoke having internal teeth carried by the lower end of said shaft, a segment meshing with said teeth, a treadle shaft adapted to actuate said segment, said treadle shaft extending to the exterior of the framework at the lower portion thereof and adapted to swing about circularly, means at the upper end and projecting above the motor frame for turning the shaft to bring the treadle to a required position, and means to hold the treadle in a position to disengage the clutch sleeve from both of said gear members.

4. A laundrying machine comprising a main framework, a hollow support extending up through said framework, a wringer frame rotating about said hollow support, a hollow motor frame also rotating about said hollow support, means to hold the wringer and motor frames together, means to prevent movement of the motor frame about the hollow support, wringer rolls in the wringer frame, a motor in the motor frame, gearing between said motor and wringer rolls including a pair of opposed gear members for driving the rolls in opposite directions, a clutch sleeve fitted between said opposed gear members, a shaft passing up through said hollow support arranged to rotate and slide axially therein, means on the shaft engaging the clutch sleeve, a yoke having internal teeth carried by the lower end of the shaft below the hollow support, a segment having teeth meshing with the teeth on the yoke, a treadle shaft for turning said segment to raise and lower the shaft, a ring extending about said main frame, means on the treadle shaft engaging said ring to support the same and permit circular movement thereof, means for holding the treadle shaft in an intermediate neutral position, and a pair of treadles on the shaft extending outwardly beyond said main frame to permit of moving the shaft in either direction.

In testimony whereof, we have affixed our signatures in presence of two witnesses.

JOHN H. SIERT.
ALVIN H. SIERT.

Witnesses:
E. C. STURGES,
ARTHUR H. STURGES.